Patented Aug. 14, 1945

2,382,211

UNITED STATES PATENT OFFICE 2,382,211

REACTION PRODUCTS OF ALDEHYDES AND DIAZINE DERIVATIVES

Gaetano F. D'Alelio and James W. Underwood, Pittsfield, Mass., assignors to General Electric Company, a corporation of New York No Drawing. Application July 14, 1942,
Serial No. 450,916

20 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes, hydroxyaldehydes and aldehyde-addition products, e. g., formaldehyde, paraformaldehyde, aldol, glucose, dimethylol urea, trimethylol melamine, etc., and a diazine derivative corresponding to the following general formula:

I
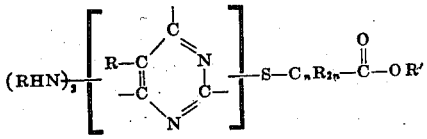

In the above formula $n$ represents an integer and is at least 1 and not more than 2, R represents a member of the class consisting of hydrogen and monovalent hydrocarbon and substituted hydrocarbon radicals, more particularly halo-hydrocarbon radicals, and R' represents a member of the class consisting of monovalent aliphatic hydrocarbon radicals and monovalent aromatic and nuclearly substituted, specifically nuclearly halogenated, aromatic hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclohexyl, cyclohexenyl, cycloheptyl, etc.); aryl (e. g., phenyl, naphthyl); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, cinnamyl, phenylethyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals that R in the above formula may represent are: chloromethyl, chloroethyl, chlorophenyl, ethyl chlorophenyl, dichlorophenyl, chlorocyclohexyl, phenyl chloroethyl, bromoethyl, bromopropyl, fluorophenyl, iodophenyl, bromotolyl, etc.

Illustrative examples of monovalent aliphatic and aromatic hydrocarbon radicals that R' in the above formula may represent are: methyl, ethyl, propyl, isopropyl, butyl, secondary butyl, isobutyl, butenyl, amyl, isoamyl, hexyl, octyl, allyl, methallyl, ethallyl, crotyl, cyclopentyl, cyclopentenyl, cyclohexyl, cyclohexenyl, cycloheptyl, benzyl, cinnamyl, phenylethyl, phenylpropyl, phenyl, diphenyl, naphthyl, anthracyl, tolyl, xylyl, ethylphenyl, propylphenyl, isopropylphenyl, allylphenyl, propenylphenyl, 2-butenylphenyl, tertiary-butylphenyl, methylnaphthyl and the like. Illustrative examples of monovalent, nuclearly substituted, specifically nuclearly halogenated, aromatic hydrocarbon radicals that R' also may represent are: chlorophenyl bromophenyl, dichlorophenyl, dibromophenyl, iodophenyl, fluorophenyl, chlorotolyl, bromotolyl, chloroxylyl, chloronaphthyl, dichloronaphthyl, chloroxenyl, dichloroxenyl, bromoxenyl and the like.

Preferably R in Formula I is hydrogen. However, there also may be used in carrying the present invention into effect compounds such, for instance, as those represented by the general formulas:

II
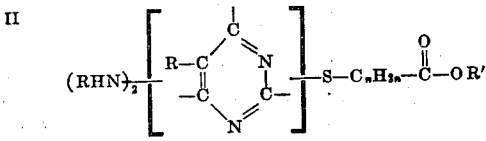

and, more particularly,

III
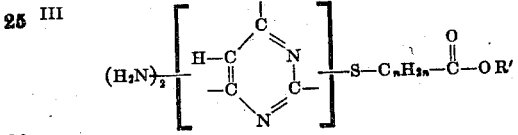

specifically

IV
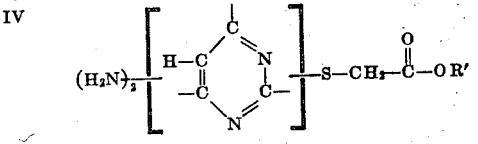

and

V
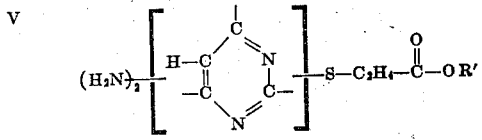

where $n$, R and R' have the same meanings as given above with reference to Formula I.

Instead of the substituted pyrimidines (1,3- or meta-diazines) represented by the above formulas, corresponding derivatives of the 1,2- or ortho-diazines (pyridazines) or of the 1,4- or para-diazines (pyrazines) may be used. Also, instead of the monothio compounds represented by the above formulas, the di-thio derivatives of the 1,2-, 1,3- or 1,4- diazines may be employed.

The diazine derivatives that are used in carrying the present invention into effect are more fully described and are specifically claimed in our copending application Serial No. 450,918, filed concurrently herewith, now Patent No. 2,352,945, issued July 4, 1944, and assigned to the same assignee as the present invention. As pointed out in this copending application, a method of preparing the diazine derivatives used in practicing the present invention comprises effecting reaction in the presence of a hydrohalide acceptor, e. g., an alkali-metal hydroxide, between a mercapto diazine corresponding to the general formula

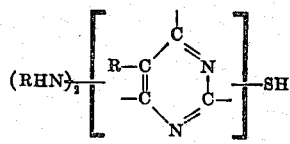

where R has the same meaning as given above with reference to Formula I, and an ester of a halo monocarboxylic acid corresponding to the general formula

where X represents a halogen atom and n, R and R' have the same meanings as given above with reference to Formula I.

Examples of diazine derivatives embraced by Formula I that may be used in producing our new condensation products are listed below:

Methyl (diamino pyrimidyl thio) acetate
Ethyl (dianilino pyrimidyl thio) acetate
Propyl (diamino pyrimidyl thio) acetate
Butyl (diamino pyrimidyl thio) acetate
Pentyl (diamino pyrimidyl thio) acetate
Hexyl (diamino pyrimidyl thio) acetate
Phenyl (diamino pyrimidyl thio) acetate
Tolyl (diamino pyrimidyl thio) acetate
Xylyl (diamino pyrimidyl thio) acetate
Xenyl (diamino pyrimidyl thio) acetate
Methyl [4,6-di-(ethylamino) pyrimidyl-2 thio] acetate
Methyl (2,6-dianilino pyrimidyl-4 thio) acetate, which also may be named methyl (2,4-dianilino pyrimidyl-6 thio) acetate
Ethyl [4,6-di-(isobutylamino) pyrimidyl-2 thio] acetate
Ethyl [4,6-di-(propenylamino) pyrimidyl-2 thio] acetate
Isobutyl [4,6-di-(cyclopentylamino) pyrimidyl-2 thio] acetate
Propenyl [4,6-di-(benzylamino) pyrimidyl-2 thio] acetate
Cyclopentyl [4,6-di-(phenethylamino) pyrimidyl-2 thio] acetate
Chlorotolyl (diamino pyrimidyl thio) acetate
Fluorophenyl (diamino pyrimidyl thio) acetate
The methyl (diamino pyrimidyl thio) chloropropionates
Tolyl [4,6-di-(naphthylamino) pyrimidyl-2 thio] acetate
Xylyl (4,6-ditoluido pyrimidyl-2 thio) acetate
Methyl (4,6-diamino 5-methyl pyrimidyl-2 thio) acetate
Ethyl [4,6-di-(methylamino) 5-ethyl pyrimidyl-2 thio] acetate
Phenyl (4,6-diamino 5-methyl pyrimidyl-2 thio) acetate
Benzyl (4,6-diamino 5-phenyl pyrimidyl-2 thio) acetate
Phenethyl (4,6-dianilino 5-methyl pyrimidyl-2 thio) acetate
Propyl (4,6-diamino 5-cyclopentyl pyrimidyl-2 thio) acetate
Methyl alpha-(diamino pyrimidyl thio) propionate.
Methyl beta-(diamino pyrimidyl thio) propionate
Ethyl alpha-(4,6-dianilino pyrimidyl-2 thio) propionate
Ethyl alpha-[4,6-di-(methylamino) pyrimidyl-2 thio] propionate
Phenyl alpha-(diamino pyrimidyl thio) propionate.
Phenyl beta-(diamino pyrimidyl thio) propionate
Phenyl beta-(4,6-dianilino pyrimidyl-2 thio) propionate
Bromophenyl alpha-(diamino pyrimidyl thio) propionate
Iodophenyl beta-(diamino pyrimidyl thio) propionate
Methyl alpha-(4,6-diamino 5-isobutyl pyrimidyl-2 thio) propionate
Ethyl alpha-(4,6-diamino 5-chlorophenyl pyrimidyl-2 thio) propionate
Octyl beta-(4,6-diamino 5-phenyl pyrimidyl-2 thio) propionate
Tetradecyl (diamino pyrimidyl thio) acetate
Methyl (4-methylamino 6-amino pyrimidyl-2 thio) acetate
Methyl (4-anilino 6-amino pyrimidyl-2 thio) acetate
Phenyl (4-anilino 6-methylamino pyrimidyl-2 thio) acetate
Ethylphenyl (4-methylamino 5-methyl 6-ethylamino pyrimidyl-2 thio) acetate
Allyl (diamino pyrimidyl thio) acetate
Allyl (4-anilino 5-tolyl 6-amino pyrimidyl-2 thio) acetate
Allyl alpha-(diamino pyrimidyl thio) propionate
Allyl beta-(diamino pyrimidyl thio) propionate
Phenyl alpha-(4-methylamino 5-iodophenyl 6-amino pyrimidyl-2 thio) propionate
Methyl alpha-phenyl beta-(4,6-diamino 5-propenyl pyrimidyl-2 thio) propionate
Methyl alpha-ethyl beta-tolyl alpha-(4,6-diamino pyrimidyl-2 thio) propionate
Phenyl alpha-[2,6-di-(methylamino) pyrimidyl-4 thio] propionate
Methyl [2,6-di-(chloroethylamino) pyrimidyl-4 thio] acetate
Ethyl [2,4-di-bromoanilino) pyrimidyl-6 thio] acetate
Ethyl (4,6-diamino pyrimidyl-2 thio) acetate
Ethyl (2,6-diamino pyrimidyl-4 thio) acetate
Methyl [4,6-di-(methylamino) pyrimidyl-2 thio] acetate
Ethyl alpha-(4,6-diamino pyrimidyl-2 thio) propionate
Ethyl beta-(4,6-diamino pyrimidyl-2 thio) propionate and similar aliphatic (e. g., alkyl, alkenyl), aromatic and nuclearly halogenated aromatic esters of the (diamino pyrimidyl thio) substituted acetic and propionic acids.

It will be understood, of course, by those skilled in the art that, in those compounds listed above that are generically named, the monocarboxylic ester-substituted thio groupings may be attached to any of the carbon atoms of the pyrimidine nucleus in the 2, or 4, or 6 positions. In other words, the expression "diamino pyrimidyl" includes within its meaning both the 4,6-diamino pyrimidyl-2 and the 2,6-diamino pyrimidyl-4 (2,4-diamino pyrimidyl-6) derivatives.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a diazine derivative of the kind embraced by Formula I, numerous examples of which have been given above and in our above-identified copending application.

In the production of molded articles from molding compositions comprising a filled or unfilled resin, it is highly desirable that the molding compound have a high plastic flow during molding combined with a rapid cure to an insoluble, infusible state. Surprisingly, it was found that the heat-curable resinous condensation products of this invention and molding compositions made therefrom show excellent flow characteristics during a short curing cycle. The molded articles have a high dielectric strength and very good resistance to arcing. They have a good surface finish and excellent resistance to water, being better, in general, than the ordinary urea-formaldehyde resins in this respect. The cured resins have a high resistance to heat and abrasion, and therefore are especially suitable for use where optimum heat- and abrasion-resistance are properties of primary importance. The reaction products of an aldehyde with a diazine derivative of the kind used in practicing our invention are not the equivalent of, and are not to be confused with, reaction products of an aldehyde with a triazine derivative having attached to the carbon atoms of the triazine nucleus two [(—NHR)$_2$] groupings and one —S—C$_n$R$_{2n}$—COOR' grouping, where $n$, R and R' have the same meanings as given above with reference to Formula I.

In practicing our invention the initial condensation reaction may be carried out at normal or at elevated temperatures, at atmospheric, sub-atmospheric or super-atmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxide, sodium or potassium carbonates, mono-, di- or tri-amines, etc. In some cases it is desirable to cause the initial condensation reaction between the components to take place in the presence of a primary condensation catalyst and a secondary condensation catalyst. The primary catalyst advantageously is either an aldehyde-non-reactable nitrogen-containing basic tertiary compound, e. g., tertiary amines such as trialkyl (e. g., trimethyl, triethyl, etc.) amines, triaryl (e. g., triphenyl, tritolyl, etc) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the diazine derivative may be carried out in the presence of solvents or diluents, fillers, other natural or synthetic resinous bodies, or while admixed with other materials that also can react with the aldehydic reactant or with the diazine derivative, e. g., ketones, urea (NH$_2$CONH$_2$), thiourea, selenourea, iminourea (guanidine), substituted ureas, thioureas, selenoureas and iminoureas, numerous examples of which are given in various copending applications of one or both of us, for instance in D'Alelio copending application Serial No. 363,037, filed October 26, 1940, now Patent No. 2,322,566, issued June 22, 1943; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aldehyde-reactable diazines other than the diazine derivatives constituting the primary components of the resins of the present invention; aminotriazines, e. g., melamine, ammeline, ammelide, melem, melam, melon, numerous other examples being given in various copending applications of one or both of us, for instance in D'Alelio copending application Serial No. 377,524, filed February 5, 1941, and in applications referred to in said copending application; phenol and substituted phenols, e. g., the cresols, the xylenols, the tertiary alkyl phenols and other phenols such as mentioned, for example, in D'Alelio Patent No. 2,239,441; monohydric and polyhydric alcohols, e. g., butyl alcohol, amyl alcohol, heptyl alcohol, octyl alcohol, 2-ethylbutyl alcohol, ethylene glycol, propylene glycol, glycerine, polyvinyl alcohol, etc., amines, including aromatic amines, e. g., aniline, etc.; and the like.

The modifying reactants may be incorporated with the diazine derivative and the aldehyde to form an intercondensation product by mixing all the reactants and effecting condensation therebetween or by various permutations of reactants as described, for example, in D'Alelio copending application Serial No. 363,037 with particular reference to reactions involving a urea, an aldehyde and oxanilic acid. For instance, we may form a partial condensation product of ingredients comprising (1) urea or melamine or urea and melamine, (2) a diazine derivative of the kind embraced by Formula I, for example, an aliphatic (e. g., alkyl, alkenyl), aromatic or nuclearly halogenated aromatic ester of a (diamino pyrimidyl thio) substituted acetic or propionic acid such, for instance, as ethyl (4,6-diamino pyrimidyl-2 thio) acetate, ethyl (2,6-diamino pyrimidyl-4 thio) acetate, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, e. g., hexamethylol melamine, etc. Thereafter we may affect reaction between this partial condensation product and, for example, a curing reactant, specifically a chlorinated acetamide, to obtain a heat-curable composition.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting resinous condensation products, alone or mixed with fillers, pigments, dyes, lubricants, plasticizers, curing agents, etc., may be used, for example, in the production of molding compositions.

The liquid intermediate condensation products of this invention may be concentrated or diluted further by the removal or addition of volatile solvents to form liquid coating compositions of adjusted viscosity and concentration. The heat-convertible or potential heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect, the following examples are given by way of illustration and not by way of limitation. All parts are by weight.

*Example 1*

| | Parts |
|---|---|
| Ethyl (4,6-diamino pyrimidyl-2 thio) acetate | 21.6 |
| Aqueous formaldehyde (approx. 37.1% HCHO) | 32.4 |
| Sodium hydroxide in 13.5 parts water | 0.09 |
| Chloroacetamide (monochloroacetamide) | 0.5 |

All of the above ingredients with the exception of chloroacetamide were heated together under reflux at the boiling temperature of the mass for 15 minutes, yielding a clear syrup having a pH of 5.67. The above-stated amount of chloroacetamide was now added and heating under reflux was continued for an additional 5 minutes. A molding (moldable) composition was made from the resulting resinous syrup by mixing therewith 35 parts alpha cellulose in flock form and 0.2 part of a mold lubricant, specifically zinc stearate. The wet molding compound was dried for 1½ hours at 60° C. Two samples of the dried and ground molding composition were molded at 140° C. under a pressure of 2000 pounds per square inch, using in one case a molding time of 3 minutes and, in the other, a molding time of 5 minutes. In both cases well-cured molded pieces having good water resistance were obtained. The molding compound showed very good plastic flow during molding as evidenced by the amount of flash on the molded piece.

Instead of using chloroacetamide in accelerating the curing of the potentially reactive resinous material, heat-convertible compositions may be produced by adding to the partial condensation product (in syrupy or other form) direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, ethylene diamine hydrochloride, aminoacetamide hydrochloride, the ethanolamine hydrochlorides, nitrourea, chloroacetyl urea, chloroacetone, glycine, sulfamic acid, citric diamide, phenacyl chloride, etc.). Other examples of curing reactants that may be employed to accelerate or to effect the curing of the thermosetting or potentially thermosetting resins of this and other examples are given in various copending applications of one or both of us, for instance in D'Alelio copending applications Serial No. 346,962, filed July 23, 1940, now Patent No. 2,325,375, and Serial No. 354,395, filed August 27, 1940, now Patent No. 2,325,376, both of which applications issued as patents on July 27, 1943, and are assigned to the same assignee as the present invention.

Instead of effecting reaction between the aldehyde and the diazine derivative by heating together under reflux as above described, reaction therebetween may be effected by shaking the mixed components at room temperature for a prolonged period, for example for 24 to 72 hours or longer.

*Example 2*

| | Parts |
|---|---|
| Ethyl (4,6-diamino pyrimidyl-2 thio) acetate | 21.6 |
| Urea | 24.0 |
| Aqueous formaldehyde (approx. 37.1% HCHO) | 81.0 |
| Sodium hydroxide in 12 parts water | 0.24 |
| Chloroacetamide | 0.5 |

All of the above components with the exception of the chloroacetamide were heated together under reflux at the boiling temperature of the mass for 5 minutes, yielding a clear syrup. The chloroacetamide was now added and refluxing was continued for an additional 5 minutes. A molding compound was prepared as described under Example 1 with the exception that the drying time was 1 hour at 60° C. A well-cured, light-colored molded piece was produced by molding a sample of the dried and ground molding compound for 4 minutes at 140° C. under a pressure of 2000 pounds per square inch. The molding composition showed good plastic flow during molding.

*Example 3*

| | Parts |
|---|---|
| Ethyl (4,6-diamino pyrimidyl-2 thio) acetate | 21.6 |
| Para-toluene sulfonamide | 15.9 |
| Aqueous formaldehyde (approx. 37.1% HCHO) | 48.6 |
| Sodium hydroxide in 12 parts water | 0.24 |
| Water | 30.0 |
| Chloroacetamide | 0.5 |

All of the above ingredients with the exception of the chloroacetamide were heated together under reflux at the boiling temperature of the mass for 15 minutes, yielding a clear syrup. The chloroacetamide was now added and refluxing was continued for an additional 5 minutes. A molding compound was prepared as described under Example 1. Samples of the molding composition were molded likewise as described under Example 1. The sample that had been molded for 3 minutes was slightly elastic at the temperature of the mold but stiffened when cold. The sample that had been subjected to curing conditions for 5 minutes also was slightly elastic at mold temperature but stiffened on cooling. The thermoelasticity of the molded articles of this example indicates that such compounds would be particularly useful in molding threaded caps and the like where it is desirable to be able to spring the molded piece while hot from the mold without unscrewing.

*Example 4*

| | Parts |
|---|---|
| Ethyl (4,6-diamino pyrimidyl-2 thio) acetate | 21.6 |
| Dimethylol urea | 40.5 |
| Sodium hydroxide in 9 parts water | 0.18 |
| Water | 60.0 |
| Chloroacetamide | 0.5 |

The same procedure was followed in making the syrup and molding compound as described under Example 3 with the exception that the wet molding compound was dried for 3 hours at 60° C. Samples of the dried and ground molding compound were molded at 140° C. under a pressure of 2000 pounds per square inch, one sample being molded for 4 minutes and the other for 5 minutes. In both cases light-colored, well-cured molded pieces were obtained. The piece that had been subjected to curing conditions for 5 minutes appeared to be a little better cured than the other sample. The article that had been cured for 5 minutes absorbed only 2.95% by weight of water when tested for its water resistance by immersing in boiling water for 15 minutes, followed by immersion in cold water for 5 minutes. The plasticity of the molding compound during molding was very good.

*Example 5*

| | Parts |
|---|---|
| Ethyl (4,6-diamino pyrimidyl-2 thio) acetate | 21.6 |
| Furfural | 28.8 |
| Sodium hydroxide in 7.5 parts water | 0.15 | were heated together under reflux at the boiling temperature of the mass for 15 minutes, yielding a dark brown, syrupy condensation product. This material bodied to a thermoplastic mass when a sample of it was heated on a 135° C. hot plate. The addition of chloroacetamide or sodium chloroacetate to the viscous resin or to the dehydrated material, followed by heating on a 135° C. hot plate, caused the resin to convert slowly to an insoluble and infusible or cured state. Sulfamic acid, citric acid and phthalic acid gave somewhat faster curing resinous compositions.

*Example 6*

| | Parts |
|---|---|
| Ethyl (4,6-diamino pyrimidyl-2 thio) acetate | 21.6 |
| Acrolein | 16.8 |
| Sodium hydroxide in 7.5 parts water | 0.14 |

The same procedure was followed as described under Example 5, yielding a product having properties that were much the same as the product of that example.

*Example 7*

| | Parts |
|---|---|
| Ethyl (4,6-diamino pyrimidyl-2 thio) acetate | 21.6 |
| Butyl alcohol | 37.0 |
| Aqueous formaldehyde (approx. 37.1% HCHO) | 32.4 |
| Sodium hydroxide in 9 parts water | 0.18 | were heated together under reflux at the boiling temperature of the mass for 20 minutes, yielding a clear resinous syrup. The addition of curing agents such as mentioned under Example 1 either to the resinous syrup or to the dehydrated resin, followed by heating on a 135° C. hot plate, yielded a resin that cured under heat to an insoluble and infusible state. A slow cure was obtained with sodium chloracetate or chloroacetamide, but rapidly curing resins were obtained when sulfamic acid or citric acid constituted the curing agent. The dehydrated or undehydrated syrupy condensation product of this example is soluble in ethyl alcohol and other organic solvents. The solubility and film-forming characteristics of the resinous composition produced in accordance with the above formula make it especially suitable for use in the preparation of coating and impregnating compositions. For example, it may be used in the production of spirit and baking varnishes. It may be employed as a modifier of varnishes of the amino-plast and alkyd-resin types.

*Example 8*

| | Parts |
|---|---|
| Ethyl (4,6-diamino pyrimidyl-2 thio) acetate | 21.6 |
| Diethyl malonate | 16.0 |
| Aqueous formaldehyde (approx. 37.1% HCHO) | 48.6 |
| Sodium hydroxide in 7.5 parts water | 0.15 | were heated together under reflux at the boiling temperature of the mass for 15 minutes, yielding a clear, colorless syrup. This syrupy condensation product was potentially heat-curable as shown by the fact that when a curing agent such as mentioned under Example 1 was incorporated into the syrupy material or into the dehydrated resin, followed by heating on a 135° C. hot plate, an insoluble and infusible resinous mass was obtained. Sulfamic acid caused the resin to cure faster than did chloroacetamide.

*Example 9*

| | Parts |
|---|---|
| Ethyl (4,6-diamino pyrimidyl-2 thio) acetate | 21.6 |
| Glycerine | 9.4 |
| Aqueous formaldehyde (approx. 37.1% HCHO) | 32.4 |
| Sodium hydroxide in 6 parts water | 0.12 |

The same procedure was followed as described under Example 8. A clear, light yellow syrup was obtained. This syrupy condensation product was soluble in ethyl alcohol and water. Its curing characteristics were much the same as the product of Example 8.

The thermoplastic resins of Examples 8 and 9 may be used advantageously as a plasticizer of less plastic resins and molding compositions to improve their plasticity or flow characteristics.

*Example 10*

| | Parts |
|---|---|
| Ethyl (4,6-diamino pyrimidyl-2 thio) acetate | 21.6 |
| Polyvinyl alcohol | 26.4 |
| Aqueous formaldehyde (approx. 37.1% HCHO) | 64.8 |
| Sodium hydroxide in 12 parts water | 0.24 |
| Water | 50.0 | were heated together under reflux at the boiling temperature of the mass for 15 minutes, yielding a clear, colorless syrup. This syrup bodied to a rubbery, thermoplastic mass when a sample of it was heated on a 135° C. hot plate. The thermoplastic material was potentially heat-curable as shown by the fact that when chlorocetamide, sulfamic acid, sodium chloroacetate, glycine or other curing agent such as mentioned under Example 1 was incorporated into the syrupy condensation product or into the thermoplastic resin, the resin cured to an insoluble and infusible state when heated on a 135° C. hot plate. The cure with chloroacetamide was slower than with sulfamic acid.

*Example 11*

The resinous composition of Example 7 was mixed with an oil-modified alkyd resin in the ratio of, by weight, 1 part of the former to 5 parts of the latter. The resulting mixture was heated under reflux at the boiling temperature of the mass for 45 minutes. A sample of the varnish thereby produced was applied to a glass plate and the coated plate was baked at 110° C. for 5 hours. A hard, clear film that adhered tightly to the glass surface was formed on the plate.

It will be understood, of course, by those skilled in the art that the reaction between the aldehyde and the diazine derivative may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients set forth in the above examples at boiling temperature under reflux, the reaction between the components may be carried out at lower temperatures, for example at temperatures ranging from room temperature to a temperature near the boiling temperature, using longer reaction periods and, in some cases, stronger catalysts and higher catalyst concentrations.

It also will be understood by those skilled in the art that our invention is not limited to condensation products obtained by reaction of ingredients comprising an aldehyde and the specific diamino monocarboxylic-ester substituted thio pyrimidine mentioned in the above illustrative examples. Thus, instead of ethyl (4,6-diamino pyrimidyl-2 thio) acetate, we may use, for example, ethyl (2,6-diamino pyrimidyl-4 thio) acetate, other alkyl and alkenyl (diamino pyrimidyl thio) acetates, an aromatic (e. g., a phenyl tolyl, xylyl, etc.) or a nuclearly halogenated aromatic such as a nuclearly chlorinated or brominated aromatic ester of a (diamino pyrimidyl thio) substituted acetic acid, an aliphatic, aromatic or nuclearly halogenated aromatic ester of a (diamino pyrimidyl thio) substituted propionic acid, or any other compound of the kind embraced, for example, by Forumla I, numerous examples of which have been given hereinbefore and in our copending application Serial No. 450,918.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylenetetramine, etc. Illustrative examples of other aldehydes that may be employed are acetaldehyde, propionaldehyde, butyraldehyde, heptaldehyde, octaldehyde, methacrolein, crotonaldehyde, benzaldehyde, furfural, hydroxyaldehydes (e. g., aldol, glucose, glycollic aldehyde, glyceraldehyde, etc.), mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, and of substituted ureas, thioureas, selenoureas and iminoureas, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of the aminotriazoles, mono- and poly-(N-carbinol) derivatives of the aminotriazines, etc. Particularly good results are obtained with active methylene-containing bodies such as a methylol urea, more particularly mono- and di-methylol ureas, a methylol aminotriazine, more particularly a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the diazine derivative may be varied over a wide range depending upon the particular properties desired in the finished product. Ordinarily these reactants are employed in an amount corresponding to at least one mol of the aldehyde, specifically formaldehyde, for each mol of the diazine derivative. Thus, we may use, for example, from 1 to 7 or 8 or more mols of an aldehyde for each mol of the diazine derivative. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 15 or 20 or more mols of such alkylol derivatives for each mol of the diazine derivative.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for example, methyl, ethyl, propyl, isopropyl, isobutyl, hexyl, etc., alcohols; polyhydric alcohols such, for example, as diethylene glycol, triethylene glycol, pentaerythritol, etc.; alcohol-ethers, e. g., ethylene glycol monoethyl ether, ethylene glycol monomethyl ether, ethylene glycol monobutyl ether, diethylene glycol monomethyl ether, diethylene glycol monoethyl ether, diethylene glycol monobutyl ether, etc.; amides such as formamide, stearamide, acrylamide, benzene sulfonamides, toluene sulfonamides, adipic diamide, phthalamide, etc.; amines, e. g., ethylene diamine, phenylene diamine, etc.; ketones, including halogenated ketones, etc.; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio Patent No. 2,281,559, issued May 5, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers including polyvinyl acetals, specifically polyvinyl formal, etc.

Instead of effecting reaction between a diazine derivative of the kind embraced by Formula I and an aldehyde, specifically formaldehyde, we may cause an aldehyde to condense with a salt (organic or inorganic) of the diazine derivative or with a mixture of the diazine derivative and a salt thereof. Examples of organic and inorganic acids that may be used in the preparation of such salts are hydrochloric, sulfuric, phosphoric, boric, acetic, chloroacetic, propionic, butyric, valeric, acrylic, oxalic, polyacrylic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide various thermoplastic and thermosetting molding compositions.

The modified and unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What we claim as new and desire to secure by Letters Patent of the United States is:

1. A composition of matter comprising the reaction product of ingredients comprising an aldehyde and a compound corresponding to the general formula

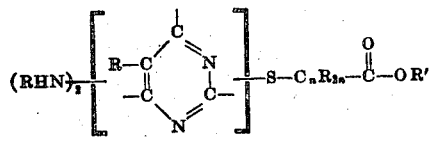

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

2. A composition as in claim 1 wherein the aldehyde is formaldehyde.

3. A composition as in claim 1 wherein the reaction product is an alkaline-catalyzed reaction product of the stated components.

4. A composition as in claim 1 wherein the reaction product is an alcohol-modified reaction product of the stated components.

5. A composition as in claim 1 wherein R represents hydrogen.

6. A heat-curable resinous composition comprising a heat-convertible condensation product of ingredients comprising formaldehyde and a compound corresponding to the general formula

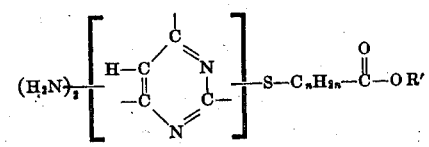

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals.

7. A product comprising the cured resinous composition of claim 6.

8. A composition comprising the resinous product of reaction of ingredients comprising an aldehyde and an aliphatic ester of a (diamino pyrimidyl thio) substituted acetic acid.

9. A resinous composition comprising the condensation product of ingredients comprising formaldehyde and an alkyl (diamino pyrimidyl thio) acetate.

10. A composition comprising the resinous product of reaction of ingredients comprising an aldehyde and an aromatic ester of a (diamino pyrimidyl thio) substituted acetic acid.

11. A resinous composition comprising the condensation product of ingredients comprising formaldehyde and a phenyl (diamino pyrimidyl thio) acetate.

12. A composition comprising the resinous product of reaction ingredients comprising an aldehyde and a nuclearly halogenated aromatic ester of a (diamino pyrimidyl thio) substituted acetic acid.

13. A resinous composition comprising the product of reaction of ingredients comprising formaldehyde and ethyl (4,6-diamino pyrimidyl-2 thio) acetate.

14. A composition comprising the product of reaction of ingredients comprising a urea, an aldehyde and a compound corresponding to the general formula

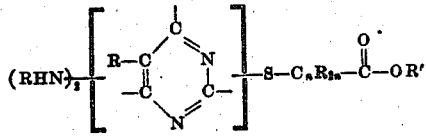

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

15. A composition as in claim 14 wherein R represents hydrogen, the urea component is the compound corresponding to the formula $NH_2CONH_2$ and the aldehyde is formaldehyde.

16. A composition comprising the product of reaction of ingredients comprising an aminotriazine, an aldehyde and a compound corresponding to the general formula

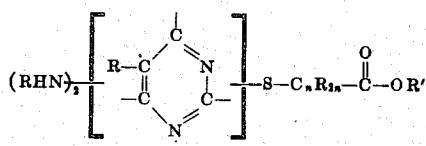

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

17. A composition as in claim 16 wherein the aminotriazine is melamine, the aldehyde is formaldehyde and R represent hydrogen.

18. A heat-curable composition comprising the heat-convertible resinous reaction product of (1) a partial condensation product of ingredients comprising formaldehyde and a compound corresponding to the general formula

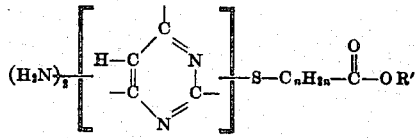

where $n$ represents an integer and is at least 1 and not more than 2, and R' represents a member of the class consisting of monovalent aliphatic hydrocarbon radicals and monovalent aromatic and nuclearly halogenated aromatic hydrocarbon radicals and (2) a curing reactant.

19. A resinous composition comprising the product of reaction of ingredients comprising urea, formaldehyde and ethyl (4,6-diamino pyrimidyl-2 thio) acetate.

20. The method of preparing new synthetic compositions which comprises effecting reaction between ingredients comprising an aldehyde and a compound corresponding to the general formula

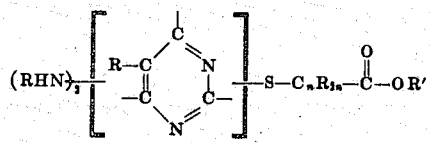

where $n$ represents an integer and is at least 1 and not more than 2, R represents a member of the class consisting of hydrogen and monovalent hydrocarbon and halo-hydrocarbon radicals, and R' represents a member of the class consisting of monovalent aliphatic hydrocarbon radicals and monovalent aromatic and nuclearly halogenated aromatic hydrocarbon radicals.

GAETANO F. D'ALELIO.
JAMES W. UNDERWOOD.